F. G. BATES.
Improvement in Friction-Clutch.
No. 132,234.  Patented Oct. 15, 1872.
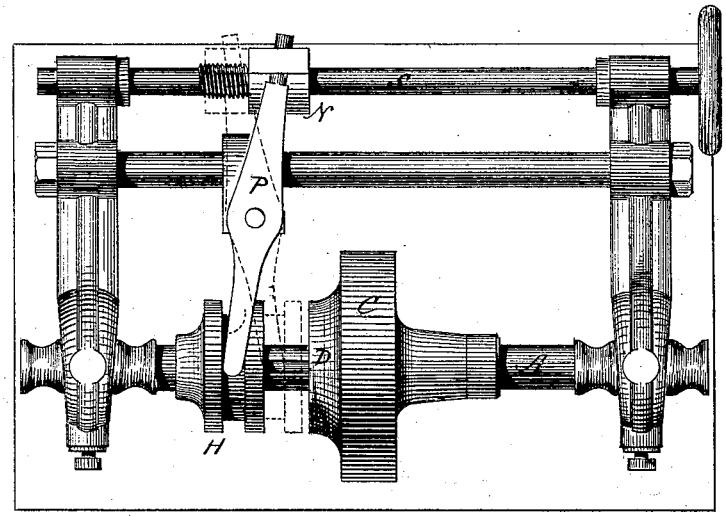
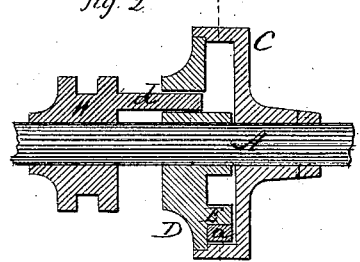
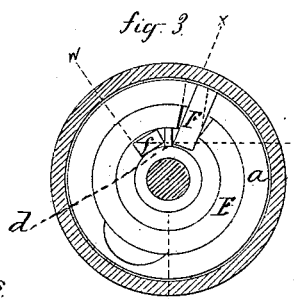
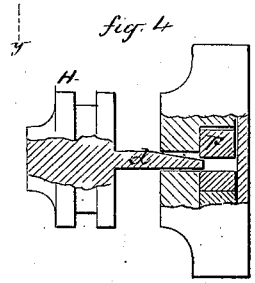
Witnesses
Francis G. Bates
Inventor

UNITED STATES PATENT OFFICE.

FRANCIS G. BATES, OF SPRINGFIELD, MASSACHUSETTS, ASSIGNOR TO THE AMERICAN CLUTCH COMPANY, OF MIDDLETOWN, CONNECTICUT.

IMPROVEMENT IN FRICTION-CLUTCHES.

Specification forming part of Letters Patent No. 132,234, dated October 15, 1872.

*To all whom it may concern:*

Be it known that I, FRANCIS G. BATES, of Springfield, in the county of Hampden and State of Massachusetts, have invented a new Improvement in Adjustable Machinery-Clutch; and I do hereby declare the following, when taken in connection with the accompanying drawing and the letters of reference marked thereon, to be a full, clear, and exact description of the same, and which said drawing constitutes part of this specification, and represents in—

Figure 1 a top view; Fig. 2, a longitudinal central section on line $x\ x$ of Fig. 3; Fig. 3, a transverse section on line $y\ y$ of Fig. 2; and in Fig. 4, a section on line $w\ w$.

This invention relates to a device to be used in combination with the clutch for which Letters Patent were granted to Peter Ferguson and myself bearing date January 16, 1872; the object being an arrangement whereby a certain amount of power less than that of one shaft may be taken from the said one shaft, adaptable in places where various machines are used requiring a small amount of power, and that derived from a main source of large power.

I will first describe the clutch referred to as the patent of Ferguson and Bates.

A is the shaft, which it is desired to drive with a certain amount of power less than the driving force or head from which the power is derived. On the said shaft A a loose pulley, C, is arranged, to which the main power is communicated, say in its full force. The said pulley is constructed with an open chamber upon one side, within which a divided ring, $a$, is arranged of slightly less diameter than the rim, as seen in Figs. 2 and 3. This ring is set upon a plate, D, which said plate is keyed fast to the shaft, a flange, E, being formed on the said plate for the support of the ring. At the division of the ring and through the flange E a lever, F, is arranged, as seen in Fig. 3, so that by the turning of the said lever to the right or left the ring $a$ will be expanded to fill the rim of the pulley. This expansion is produced by means of a sleeve, H, on the shaft, which slides longitudinally, and from which an arm, $d$, extends through the plate D against the said lever F, as seen in Figs. 3 and 4, the said arm having inclined or wedge-shaped sides, so that when the arm $d$ is forced inward the lever will be turned or pressed out of its line of rest, as denoted in broken lines, Fig. 3, which expands the ring to closely fill the rim of the pulley, creating sufficient friction to cause the pulley and plate to revolve together, which (the plate being keyed to the shaft) causes the pulley to revolve with the shaft so long as the ring is held expanded; but so soon as the arm $d$ is removed to allow the ring to contract, which it does by its own elasticity, then the plate and shaft remain stationary while the pulley continues to revolve.

In order to adjust the amount of power by which the shaft A shall be driven less than the driving force, I arrange, in connection with the movable plate H, a lever, P, by the movement of which the plate H is moved longitudinally on the shaft to force the arm $d$ into the ring $a$, or withdraw it, as the case may be, as denoted in Fig. 1. The outer end of the lever P is connected to the nut N on a shaft, S, the said shaft threaded to correspond to the thread of the nut N, and this shaft S being turned in one direction will force the plate H toward the pulley, and in the reverse direction withdraw the plate from the pulley; hence by the turning of this shaft up to such a point that the machinery driven from the shaft A will be operated and there rest, if ten horse-power be applied to the pulley C and a single horse-power is required, then a pressure must be brought to bear upon the ring $a$ to create a friction between the pulley and the said ring equal to one-tenth the driving force of the pulley. Thus it will be seen that by the turning of the shaft S to operate the lever P any given amount of power, equal to or less than the power which drives the pulley C, may be taken therefrom.

The advantages of such a device for adjusting the connection of power is too well understood to require that anything be said in this specification.

While I believe the clutch described to be the best for this method of adjustment, I do not wish to be understood as confining myself to the entire details of this construction, but to a clutch operating substantially as described.

I claim as my invention—

In combination with a clutch and pulley, substantially such as described, the lever P and adjusting-nut N, substantially as and for the purpose specified.

FRANCIS G. BATES.

Witnesses:
DEXTER S. COOLEY,
FRANK H. PHELPS.